Inventor
Basil P. Cooper
By his Attorney
Thomas J. Ryan

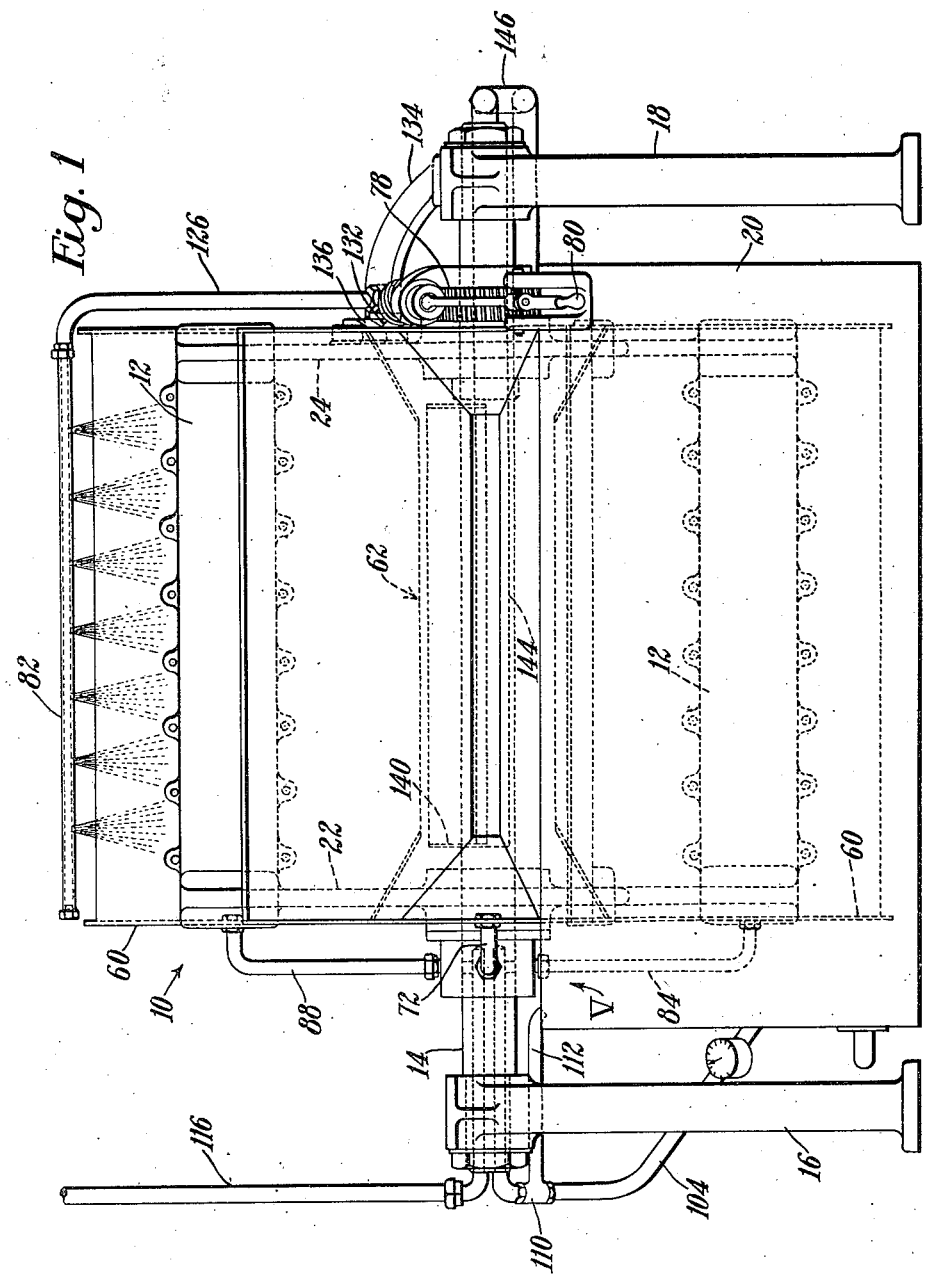

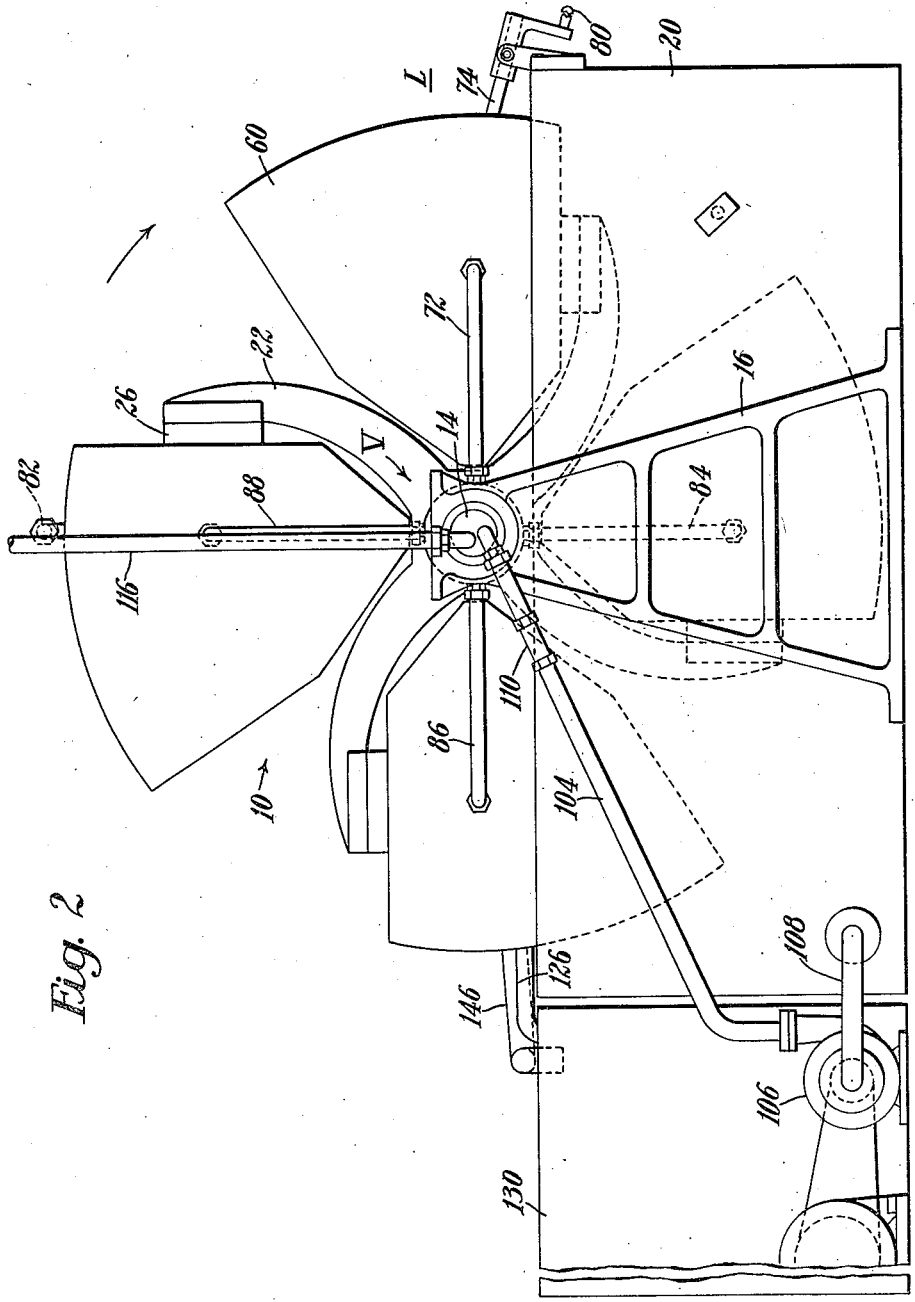

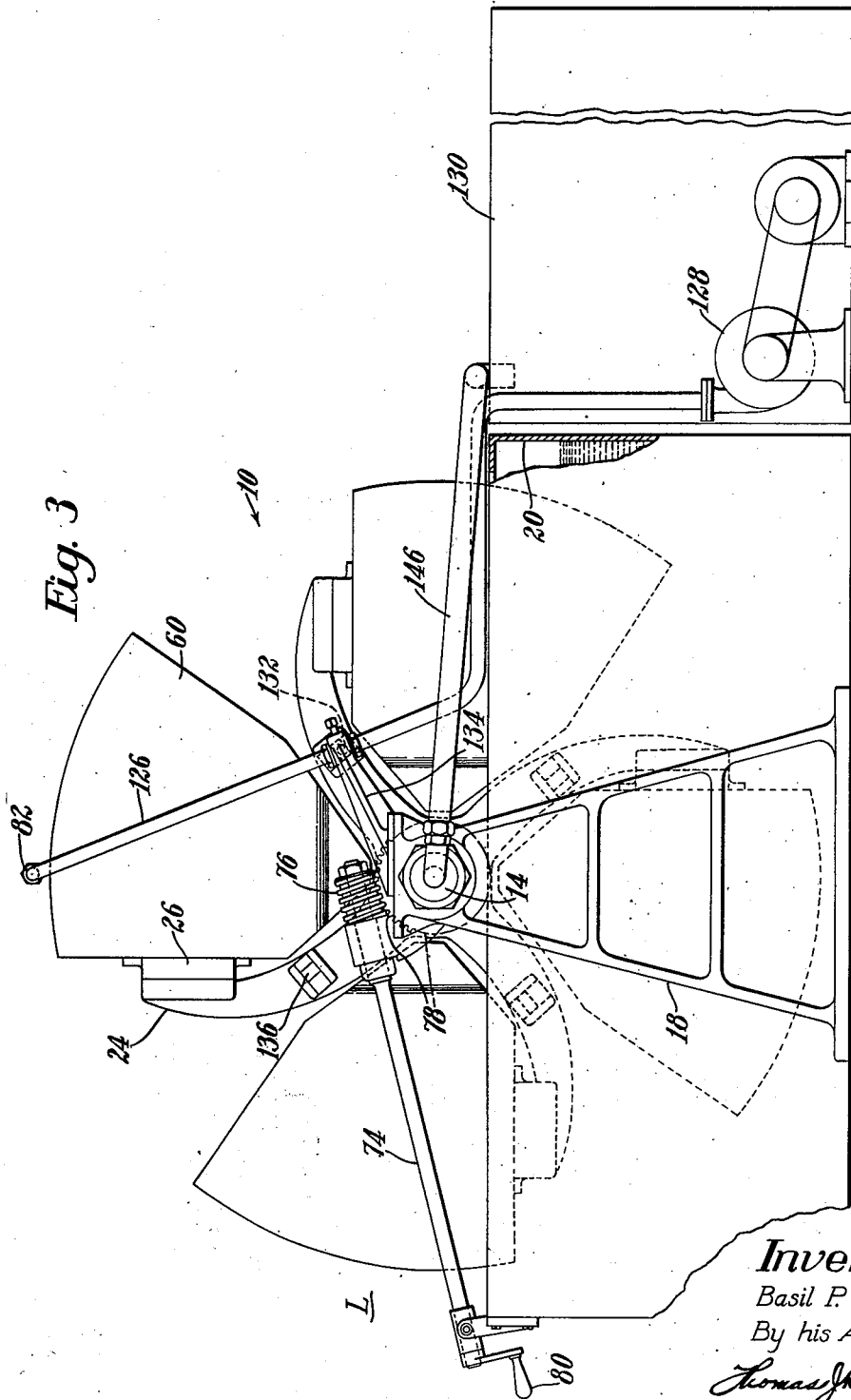

Aug. 12, 1952  B. P. COOPER  2,606,343
DEVICE FOR MOLDING HOLLOW DISPLAY FORMS
Filed April 1, 1950  5 Sheets-Sheet 5
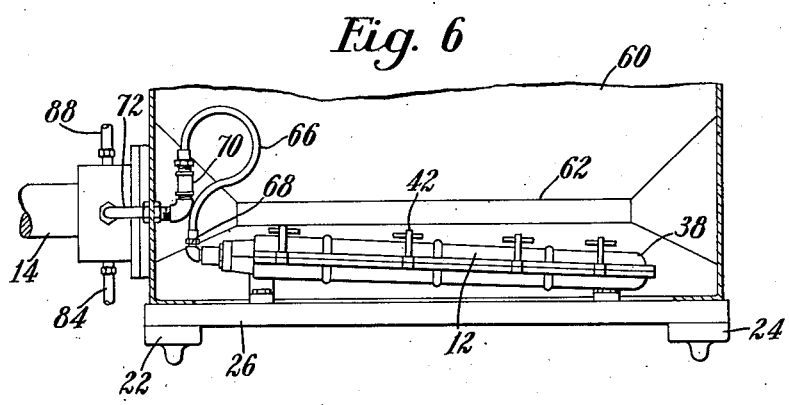
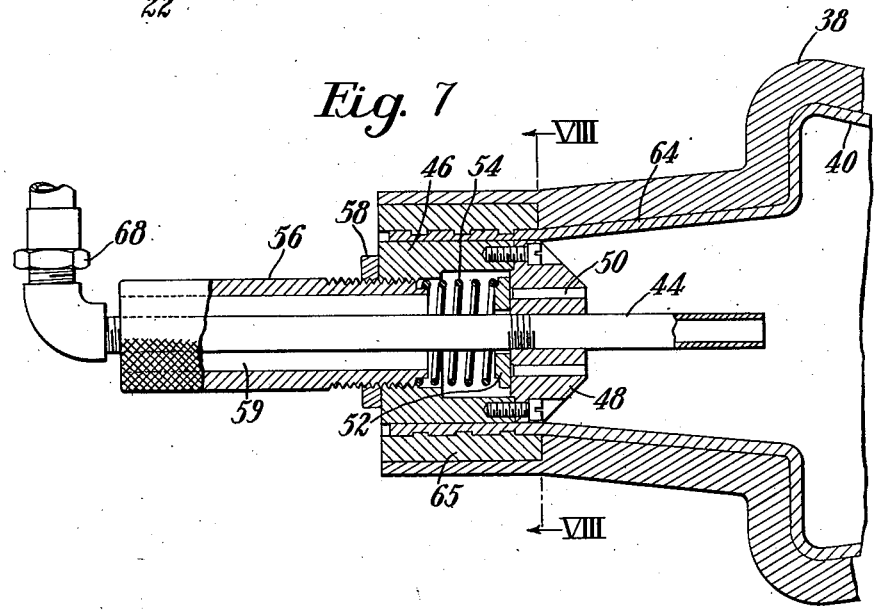
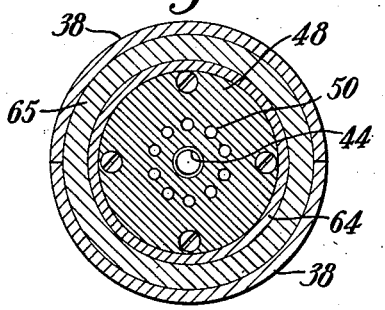
Inventor
Basil P. Cooper
By his Attorney Patented Aug. 12, 1952

2,606,343

UNITED STATES PATENT OFFICE 2,606,343

DEVICE FOR MOLDING HOLLOW DISPLAY FORMS

Basil Pomeroy Cooper, Leicester, England, assignor to United Shoe Machinery Corporation, Flemington, N. J., a corporation of New Jersey Application April 1, 1950, Serial No. 153,357
In Great Britain April 12, 1949

7 Claims. (Cl. 18—19)

This invention relates to machines for the production of hollow molded articles and is herein described as applied to the automatic production of hollow hosiery-display forms of plastic material. With the aid of such machines, there may be carried out substantially the method described in Letters Patent of the United States No. 2,029,706, granted February 4, 1936, upon the application of William J. De Witt.

In the method described in the patent the forms are produced by expanding a hollow tube of previously softened plastic material within a mold by which the shape of the article is determined. The prior apparatus for carrying out the patented method utilizes a two-part mold arranged to grip and close one end of the tubular material. At the other end, a suitable plug is provided so that steam or hot water may be introduced to expand the material to fit the mold. Commonly at that time the mold is immersed in a bath of hot water. After a suitable interval, the water is expelled from the interior of the form by means of compressed air, the pressure of which is maintained while the form is set and the mold cooled by the application thereto of cold water, sometimes in the form of a spray. The molded tube may then be removed from the mold and finished by trimming or other similar treatments to produce a form a commercially desirable characteristics. Carrying this process out manually involves a substantial amount of skill and effort on the part of the operator in handling the mold and operating necessary valves at desired intervals.

The object of this invention is to provide an improved machine in which the operator is only required to load and unload the molds, the other steps being carried out automatically.

In one embodiment, the machine is provided with a movable carrier, herein illustrated as rotatable, in which there is a conduit leading to each mold and an automatic valve mechanism for connecting these conduits successively to a source of heated fluid under pressure and later to a source of air under pressure so that the form is expanded to fit the mold by the heated fluid and is set and held, during the cooling period, by means of the compressed air. This valve mechanism may conveniently be arranged to be operated by the movement of the carrier and it is illustrated as having one portion which is part of the carrier so that the rotation thereof inherently operates the valve mechanism.

In order to expedite the cooling of the molds and the setting of the forms, the machine is provided with a device for spraying cooling water over each successive mold and, in accordance with a feature of the invention, the machine is provided with valves operated by the rotation of the carrier for automatically turning on and shutting off the supply of cooling water.

Inasmuch as the cooling takes place after the successive forms have been lifted out of the hot water bath, the point of application of the cooling spray is necessarily above the hot water bath. It will be recognized, however, that the mixture of the cool water with the hot water bath is undesirable and provision is made, in accordance with another feature of the invention, for catching and carrying off the cooling water so that it will not reach the hot water. The arrangement shown involves the use of casings around the individual molds which, while they do not interfere with the dipping of the molds in the hot water bath, are effective in the spraying position to catch the sprayed water and to transfer it to a trough at the center of the rotatable carrier by which it is diverted and drained into a cold water tank.

Another feature of the invention which contributes to the easy automatic operation of the machine resides in a specially constructed plug associated with the inlet conduit by which either hot water or compressed air is led to the interior of the form. It will be recognized that the forms being expanded by the hot water are located within the tank of hot water at the time when compressed air is supplied to blow out the water and to start the setting of the form. Accordingly, this novel plug includes a relief valve communicating with a sleeve, surrounding the inlet conduit, through which the hot water may be exhausted into the tank when driven out by the compressed air. The sleeve has the added function of controlling the setting of the relief valve, it being so positioned as to abut one end of the spring which closes that valve.

These and other features of the invention will best be understood from a consideration of the following specification taken in connection with the accompanying drawings in which Fig. 1 is a front elevation of the machine;

Fig. 2 is a side elevation taken from the left of Fig. 1;

Fig. 3 is another side elevation taken from the right of Fig. 1;

Fig. 6 shows in front elevation, on a reduced scale, that one of the molds which is at the loading station and the manner of mounting it upon the carrier;

Fig. 7 is an axial section on a larger scale through the inlet end of one of the molds; and Fig. 8 is a transverse section therethrough on the line VIII—VIII of Fig. 7.

Figure 5:
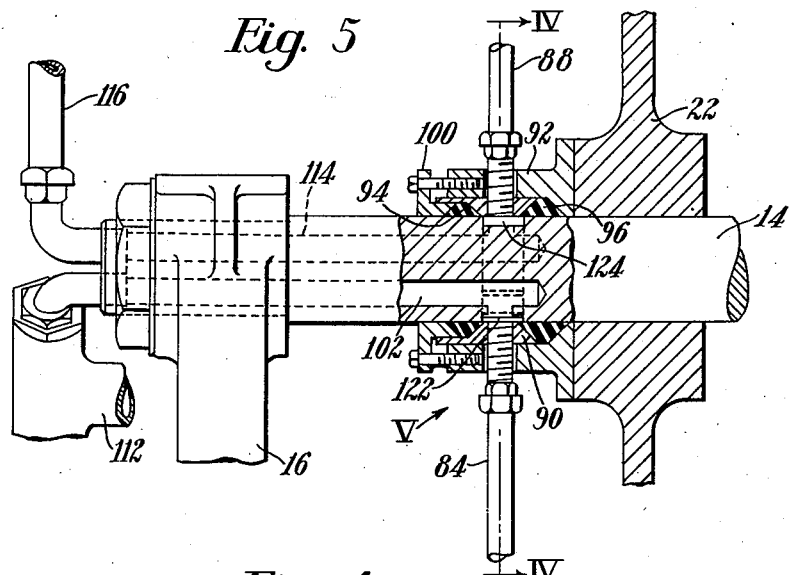
Fig. 5 is a fragmentary enlarged front elevation of the left end of the rotatable carrier of Fig. 1, showing in axial vertical section the valve mechanism also shown in Fig. 4.

The machine as a whole comprises a rotatable carrier 10 for a series of molds 12 and this carrier or turret is mounted for rotation upon a fixed shaft 14 extending between two end frames 16 and 18. Disposed between these end frames is a tank 20 for a hot water bath containing water at a temperature which may, for example, be 180° F. The rotatable carrier 10 is made up of end spiders 22 and 24 each having four arms which are joined by cross bars 26. On each cross bar there is bolted a two-part mold casing 38 (Fig. 6) having the two parts hinged together, as illustrated in the De Witt patent mentioned above. In this mold there is disposed a tubular work piece which will ultimately be expanded as shown in Fig. 7 to make a hosiery display form 40. The two parts of the mold are held together during the making of the form by a series of clamps 42.

Figure 4:
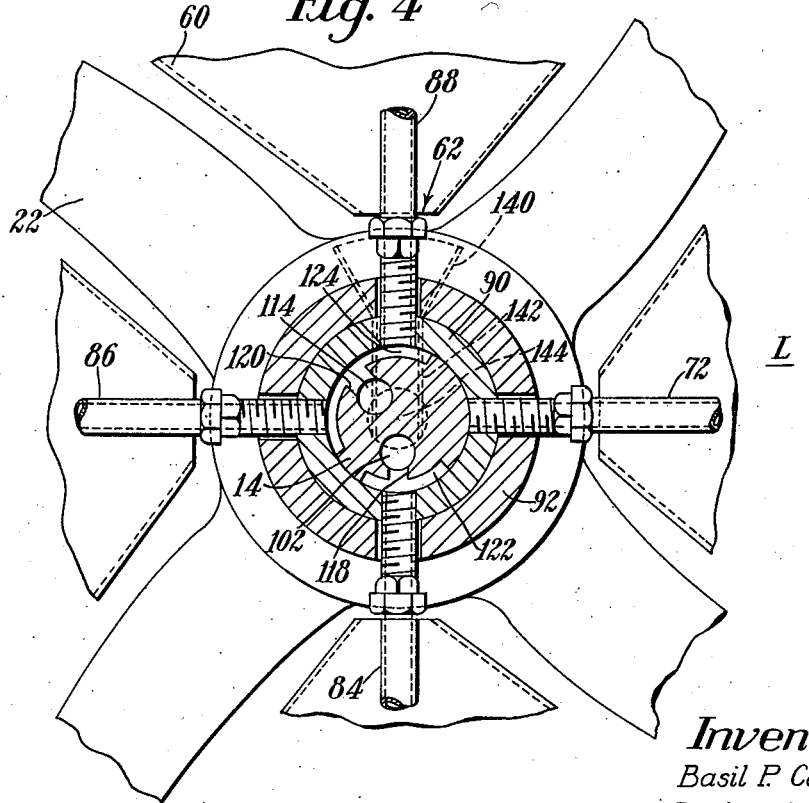
Fig. 4 is a fragmentary elevation, partly in section on the line IV—IV in Fig. 5, showing the main control valve.

In one end of the form, provision is made for the introduction of steam or compressed air through a tubular inlet conduit 44 centralized within a mold closing plug 46 by means of an end plate 48 attached thereto by means of screws. This end plate is provided with a series of apertures 50 around the conduit 44 which are normally closed by a relief valve 52 held in contact therewith by a helical spring 54 the outer end of which abuts the end of a sleeve 56. This sleeve is threaded in the plug 46 and may be adjusted to control the tension of the spring after which it is locked in adjusted position by a locknut 58. The left end of the sleeve is open to permit the hot water to be blown out through a passage 59 back into the tank 20 when compressed air is supplied through the tubular member 44. Surrounding each of the molds and also mounted upon the cross bars 26 of the carrier are individual hollow casings 60 which are open at their outer circumferences and are contracted to a delivery slot 62 at their inner circumferences (Fig. 4).

At the left in Fig. 3 and hence at the front of the machine is a loading station L where pieces of tubular material are introduced in the molds. It will be understood that, in the continued operation of the machine, any mold which is moved up to the loading station contains a finished form which must first be removed by the operator by releasing the clamps 42 and removing a plug 46 from the neck 64 (Fig. 7) of each form, after slipping off a gripping ring 65. This operation is facilitated by using a piece of flexible tubing 66 (Fig. 6) which is joined by a union 68 to the outer end of each tubular member 44. These pieces of tubing are connected by another union 70 to conduits such as that at 72 shown in Fig. 6 as supported in an end wall of the associated casing 60.

Any desired mechanism, either power driven or manually operated, may be employed for rotating the carrier through steps of 90° to carry out the method. Shown in the drawings herein is a manually operated shaft 74 (Fig. 3) joined by a worm 76 to a gear 78 which is secured to the right hand spider 24 of the carrier. The shaft 74 is provided with a handle 80 to enable manual rotation thereof by the operator. This rotation of the mold carrier in the direction of the arrows shown in Figs. 2 and 3 serves to bring each mold to the loading station L at the front of the machine then down into the hot water bath. Subsequently, each mold is raised during the continued rotation of the carrier and is then brought to the top position so that it may be sprayed with cold water from a transverse perforated pipe 82 (Fig. 1) and then carried forwardly and downwardly to the loading station.

In order to make the operation of the machine substantially automatic, a valve V is provided in which the conduit 72 and similar conduits 84, 86 and 88 are brought toward the axis of the carrier and threaded in ports in a sleeve 90 of a valve member which is rotatable with the carrier. This sleeve 90 surrounds the fixed shaft 14 and is secured to a hub 92 on the spider 22 at the left side of the carrier. Packings 94 and 96 are associated with the sleeve 90 and are compressed within the hub 92 by a packing ring 100 to insure a pressure tight joint between this valve sleeve 90 and the shaft.

Inasmuch as it is desired to fill each mold with hot water at one step in the rotation of the carrier, the fixed shaft 14 is provided with a passage 102 joined by a conduit 104 to a pump 106, motor operated and receiving its supply of hot water through an inlet 108 connected to the tank 20. In this conduit 104 there is a relief valve 110 having an exhaust pipe 112 (Fig. 1) which empties into the tank 20. Thus, when the pressure in the passage 102 exceeds the setting of the relief valve, the water forced upward by the pump 106 will be carried back into the tank. The fixed shaft is also provided at its left end with another passage 114 adapted to be joined by a vertical conduit 116 to a supply of compressed air. These passages 102 and 114 open into radial ports 118 and 120 terminating in annular grooves 122 and 124.

During the rotation of the carrier the successive conduits 72, 84, 86 and 88 come into register with these annular grooves 122, 124 and, by reason of a predetermined extent of said grooves around the periphery of the fixed shaft, provide a timing arrangement by means of which there is controlled, first, the admission of hot water through the passage 102 to the groove 122 and thence to the associated conduit joined to the mold which is approaching the bottom position.

Subsequently, the conduit of that particular form will be raised upwardly toward the rear of the machine into a position such as that shown by the conduit 86 and there it will receive compressed air led into it through the passage 114 and the groove 124 through an extended period such that the hot water is pushed out through the relief valve 52 and the sleeve 56 and the expanded form is held under pressure in expanded condition until the form reaches its uppermost position where its mold is subjected to the cooling spray from the perforated pipe 82.

This pipe is joined by a conduit 126 to a cold water pump 128 (Fig. 3) supplied by means of a cold water tank 130. A valve in this conduit 126, opened by depression of a press button 132 (Figs. 1 and 3) in the valve, is mounted upon a bracket 134 extending rearwardly from the top of the right-hand frame 18. On each of the arms of the right-hand spider 24 are secured cams 136 which depress the button 132 in the valve in the cold water supply conduit 126 and cool the uppermost form by a spray delivered from the pipe 82 at the top.

As previously mentioned, the cooling point is directly above the hot water tank 20 and it is not desired that the cold water from the spray 82 shall be mixed with the hot water. Accordingly, the fixed shaft 14 is provided with a receiving trough 140 (Figs. 1 and 4) which has one or more outlet pipes 142 terminating within an axial drain passage 144 in the fixed shaft 14 and to the right of the valve passages previously described. The outer end of this drain passage is connected by a conduit 146 (Figs. 1 and 3) which leads back to the cold water tank 130.

Thus, in the operation of the machine, it is only necessary for the operator to cause rotation of the turret carrier 10 to bring a mold to the loading station L and at that point to remove a finished form and to insert a tubular piece of material. Having then closed the mold and tightened the clamp 42, the process will be carried out automatically of passing the molds through a hot water bath which is allowed to flow around each mold 12 through the open outer circumference of the associated casing 60. Thereupon hot water under pressure will be forced into the interior of the mold to expand the tubular plastic to fit the mold. This expansion having been completed, the valve V will act to introduce compressed air which will force out the water in the mold through the passage 59. At the end of this stage the mold will be cooled by the application of a spray of cold water to set the work, after which the mold will be returned to the loading station L.

Having thus described my invention, what I claim as new and desire to secure by Letters Patent of the United States is:

1. In a machine for molding hollow display forms, a fixed shaft, a carrier rotatable upon said shaft having a series of molds mounted thereon, casings around said molds open at their outer sides, a device for spraying water on the molds to cool them at a predetermined point in the cycle of rotation, said shaft having an exhaust passage extending therethrough, and means for receiving water collected by said casings as they individually come to the spraying position and delivering it to the passage in said shaft for disposal.

2. In a machine for molding hollow display forms, a fixed shaft, a carrier movable thereon, a drain passage in said shaft leading to one end thereof, a receiving trough connected to said passage, a series of molds on said carrier, casings open at the bottom surrounding said molds and adapted to be brought into position to empty into said trough, a hot water tank beneath the carrier into which the molds are dipped, a cold water tank, means for connecting said drain passage to said latter tank, a spraying device, means for operating said spraying device when the individual casings are in cooperative relationship with said trough, and means for expanding forms in said molds and holding a form in expanded condition during the period of operation of said spray to set the form.

3. In a machine for molding hollow display forms, a hollow mold adapted to receive a tubular blank of plastic material, a plug adapted to be positioned in such a blank at one end thereof, means for securing said plug and the blank in one end of said mold to fill it, an inlet conduit for pressure fluid supported by said plug, a sleeve threaded in the outer end of said plug around said conduit, said plug having an exhaust passage communicating with the interior of said sleeve, a relief valve controlling said passage, a spring for said relief valve abutting one end of the sleeve, and means for holding said threaded sleeve in position after the compression of the spring has been adjusted by rotation of the sleeve in the plug.

4. In a machine for molding hollow display forms, a hollow mold adapted to receive a tubular blank of plastic material, an annular plug adapted to be positioned in such a blank at one end thereof, means for securing said plug and the blank in one end of said mold to fill said end, an inlet conduit for introducing fluid under pressure to the inside of the blank, an end plate secured to the inner end of said plug, said end plate supporting said inlet conduit, ports in said end plate around said conduit, a valve for closing said ports, a helical spring having one end pressing against said valve, an open ended sleeve threaded in the outer end of said plug and abutting the other end of said helical spring, and means for securing said sleeve in adjusted position.

5. In a machine for molding hollow display forms, a hot water tank, a carrier mounted for rotation above said tank, a series of molds mounted on said carrier for immersion in said tank upon rotation of the carrier, a cooling spray above the carrier, and means operated by rotation of the carrier for controlling said spray.

6. In a machine for molding hollow display forms, a hot water tank, a carrier mounted for rotation above said tank, a series of molds mounted on said carrier for immersion in said tank upon rotation of the carrier, a cooling spray above the carrier, means operated by rotation of the carrier for controlling said spray, and means for receiving and diverting the sprayed material to prevent its addition to the contents of the tank.

7. In a machine for molding hollow display forms, a hot water bath, a carrier provided with a series of molds positioned to pass the molds through the bath, means for automatically applying fluid-pressure to the form in the mold during the passage of the mold through the bath, a spray nozzle above the carrier, and a carrier-operated valve for controlling said nozzle.

BASIL POMEROY COOPER.

REFERENCES CITED

The following references are of record in the file of this patent:

UNITED STATES PATENTS

| Number | Name | Date |
| --- | --- | --- |
| 1,277,607 | La France | Sept. 3, 1918 |
| 1,537,697 | Roberts | May 12, 1925 |
| 2,348,738 | Hofmann | May 16, 1944 |
| 2,354,029 | Kingston | July 18, 1944 |